(12) United States Patent
Shotey

(10) Patent No.: US 7,939,758 B1
(45) Date of Patent: May 10, 2011

(54) CONVERTIBLE OUTLET COVER

(75) Inventor: Marcus J. Shotey, Scottsdale, AZ (US)

(73) Assignee: TayMac Corporation, Gilbert, AZ (US)

( * ) Notice: Subject to any disclaimer, the term of this patent is extended or adjusted under 35 U.S.C. 154(b) by 208 days.

(21) Appl. No.: 12/405,138

(22) Filed: Mar. 16, 2009

Related U.S. Application Data

(63) Continuation-in-part of application No. 12/035,336, filed on Feb. 21, 2008, now Pat. No. 7,820,910.

(60) Provisional application No. 60/890,967, filed on Feb. 21, 2007, provisional application No. 61/114,405, filed on Nov. 13, 2008, provisional application No. 61/118,024, filed on Nov. 26, 2008.

(51) Int. Cl.
 *H05K 5/03* (2006.01)
(52) U.S. Cl. .............................. 174/67; 174/66; 439/142
(58) Field of Classification Search .................... 174/50, 174/58, 53, 66, 67; 220/241, 242, 4.02; 439/142, 439/144, 147, 136, 139
See application file for complete search history.

(56) References Cited

U.S. PATENT DOCUMENTS

| | | | | |
|---|---|---|---|---|
| 5,180,886 A | * | 1/1993 | Dierenbach et al. ............. | 174/66 |
| 5,280,135 A | * | 1/1994 | Berlin et al. ..................... | 174/67 |
| 5,389,740 A | * | 2/1995 | Austin ............................. | 174/67 |
| 5,773,760 A | * | 6/1998 | Stark et al. ...................... | 174/66 |
| 6,133,531 A | | 10/2000 | Hayduke et al. | |
| 6,476,321 B1 | | 11/2002 | Shotey et al. | |
| 6,872,887 B2 | | 3/2005 | Shotey et al. | |
| 6,979,777 B2 | | 12/2005 | Marcou et al. | |
| 7,119,227 B2 | | 10/2006 | Sakakura et al. | |

* cited by examiner

*Primary Examiner* — Dhiru R Patel
(74) *Attorney, Agent, or Firm* — Booth Udall, PLC

(57) ABSTRACT

Implementations of an electrical device cover may include a base unit having an electrical device aperture therein configured to accommodate a face of a first electrical device. A portion of the base unit may be configured to cover a portion of the face of the first electrical device of a first electrical device type when the electrical device cover is installed over the first electrical device and may be configured to expose a face of a second electrical device of a second electrical device type different from the first electrical device type when the electrical device cover is installed over the second electrical device. The electrical device cover may further comprise an attachment configured to attach to the base unit and to the electrical device. The attachment may be capable of seating between two faces of the electrical device.

15 Claims, 14 Drawing Sheets

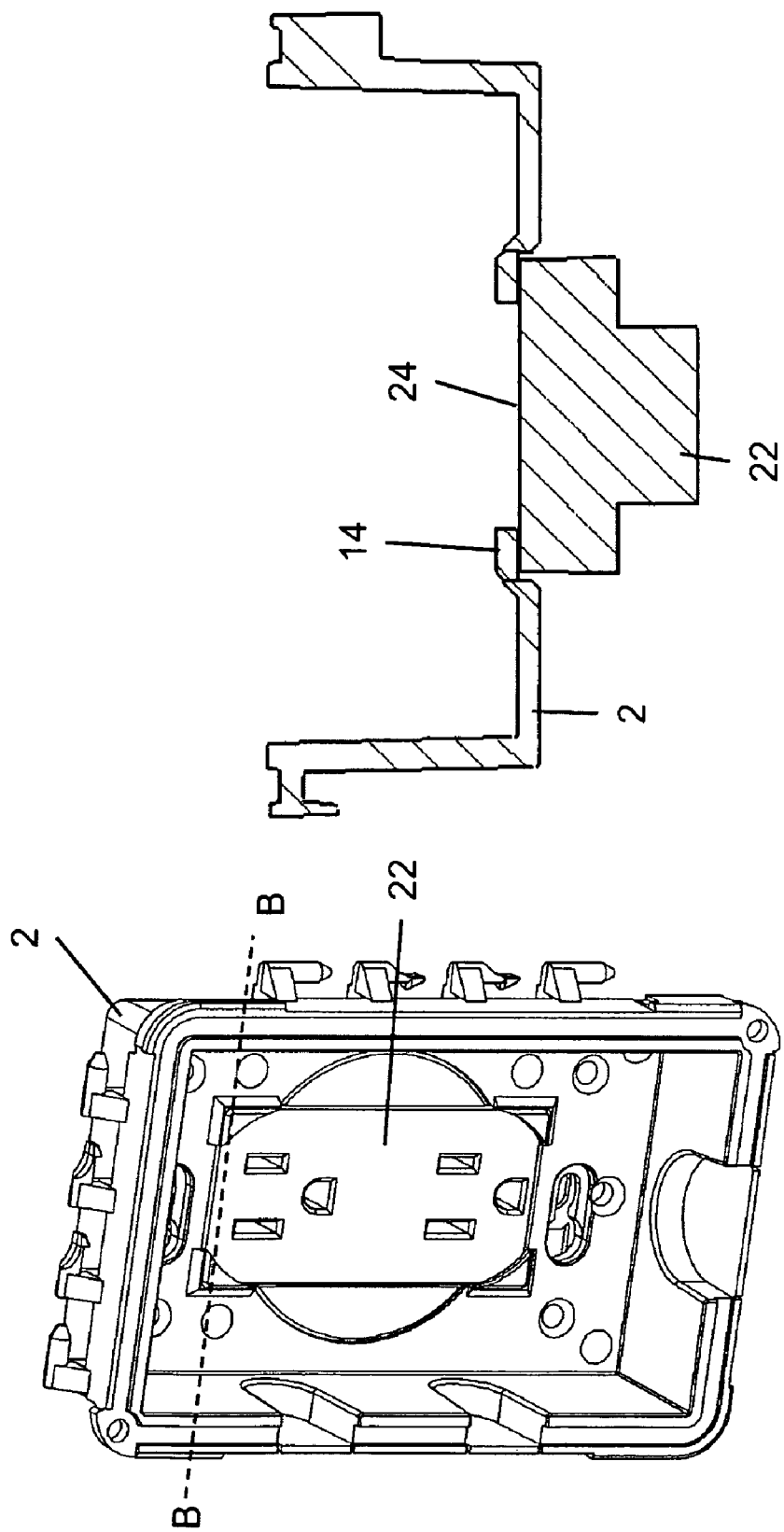

US 7,939,758 B1

CONVERTIBLE OUTLET COVER

CROSS REFERENCE TO RELATED APPLICATIONS

This application is a continuation in part of U.S. Utility patent application Ser. No. 12/035,336 to Cleghorn, et al. entitled "Adapter for Electrical Outlet Cover," which was filed on Feb. 21, 2008, now U.S. Pat. No. 7,820,910, which application claims the benefit of the filing date of U.S. Provisional Patent Application 60/890,967 to Cleghorn entitled "Slide-in Adapter Plate," which was filed on Feb. 21, 2007. This Application also claims the benefit of the filing date of U.S. Provisional Patent Application 61/114,405 to Shotey entitled "Grounding Adapter," which was filed on Nov. 13, 2008, and further claims the benefit of the filing date of U.S. Provisional Patent Application 61/118,024 to Shotey entitled "Metal Grounding Adapter," which was filed on Nov. 26, 2008, the disclosures of which are hereby incorporated herein by reference.

BACKGROUND

1. Technical Field

Aspects of this document relate generally to covers for electrical devices.

2. Background Art

Electrical outlet covers are conventionally used to protect electrical devices from water and other contaminants, prevent access to electrical wires, and/or provide a particular decorative look to an installed electrical outlet. Conventional electrical outlet covers may include a variety of components, such as bases and lids, and may be mounted in a variety of orientations, such as horizontal or vertical. Electrical outlet covers may be used in a variety of locations, including interior/exterior walls or recessed within a wall or other structure.

SUMMARY

An implementation of an electrical device cover attachment comprises: a body; at least one receptacle mounting screw aperture therethrough; and at least two flexible attachment mounting projections each extending from a side of the body; wherein the attachment is configured to attach to a base unit of the electrical device cover via the at least two flexible attachment mounting projections; and wherein the base unit comprises an electrical device aperture therein, the electrical device aperture sized to accommodate one of a face of a first receptacle and two faces of a second receptacle; and wherein the attachment is sized to fit between the two faces of the second receptacle.

Particular implementations of an electrical device cover attachment may include one, some, or all of the following. The base unit may further comprise a front surface and the attachment may be configured to attach to the base unit at the front surface. The base unit may further comprise a rear surface and the attachment may be configured to attach to the base unit at the rear surface. During operation, the second receptacle may be secured to an electrical box and the base unit may not be secured to the electrical box but the base unit may be secured to the second receptacle via the attachment. The at least two flexible attachment mounting projections may extend through the base unit and rest against the front surface. The at least two flexible attachment mounting projections may extend through the base unit and rest against the rear surface. The at least two flexible attachment mounting projections may extend through the base unit at the electrical device aperture. The base unit may further comprise at least two attachment mounting apertures therethrough adjacent to the electrical device aperture, and the at least two flexible attachment mounting projections may extend through the base unit through the at least two attachment mounting apertures. A raised projection of the base unit may be: raised above the level of the face of the first receptacle and covering a portion of the face of the first receptacle of a decora receptacle or ground fault current interrupter (GFCI) receptacle type when the base unit is installed over the first receptacle; and raised above the level of the face of a duplex receptacle and exposing a face of a duplex receptacle when the base unit is installed over the duplex receptacle.

An implementation of an electrical device cover comprises: a base unit comprising a front surface, the front surface comprising an electrical device aperture therein sized to accommodate one of a face of a first receptacle of a decora receptacle or ground fault current interrupter (GFCI) receptacle type and a face of a second receptacle of a duplex receptacle; wherein a raised projection of the base unit is: raised above the level of the face of the first receptacle and covers a portion of the face of the first receptacle of a decora receptacle or ground fault current interrupter (GFCI) receptacle type when the base unit is installed over the first receptacle; and is raised above the level of the face of a duplex receptacle and exposes a face of a duplex receptacle when the base unit is installed over the duplex receptacle.

Particular implementations of an electrical device cover may contain one, some, or all of the following. The electrical device cover may further comprise an attachment coupled to the base unit, the attachment comprising a receptacle mounting screw aperture therethrough and at least two flexible attachment mounting prongs each extending from a side of the attachment, the at least two flexible attachment mounting prongs extending through the base unit and resting against the front surface. The at least two flexible attachment mounting prongs may extend through the base unit at the electrical device aperture. The base unit may further comprise at least two attachment mounting apertures therethrough adjacent to the electrical device aperture, and the at least two flexible attachment mounting prongs may extend through the base unit through the at least two attachment mounting apertures. The electrical device cover may further comprise a lid comprising at least one lid hinge member and the base unit may further comprise at least one base unit hinge member and the lid and the base unit may be hingedly coupled together through the at least one lid hinge member and the at least one base unit hinge member. The base unit may further comprise at least one removable tab, wherein removal of the at least one removable tab converts the electrical device aperture to accommodate the face of an electrical device different from the decora receptacle and ground fault current interrupter (GFCI) receptacle types. The base unit may further comprise at least one attachment plate, wherein the attachment plate converts the electrical device aperture to accommodate a face of a third electrical device of an electrical device different from the decora receptacle and ground fault current interrupter (GFCI) receptacle types. The attachment plate may further comprise at least one removable tab, wherein removal of the at least one removable tab converts the electrical device aperture to accommodate the face of an electrical device different from the decora receptacle and ground fault current interrupter (GFCI) receptacle types.

A method of installing an electrical device cover comprises: providing a base unit comprising an electrical device aperture therein, the electrical device aperture configured to expose a face of a duplex receptacle; coupling an attachment to the base; inserting the base unit over one of a decora receptacle, a ground fault current interrupter (GFCI) receptacle, and a duplex receptacle; and coupling the attachment to at least one of the duplex receptacle, ground fault current interrupter (GFCI) receptacle, and decora receptacle.

Particular implementations of a method of installing an electrical device cover may comprise one, some, or all of the following. The method may further comprise fitting a projection of the base unit over a portion of the face of the decora receptacle or ground fault current interrupter (GFCI) receptacle. The method may further comprise the step of seating the attachment between two faces of the duplex receptacle.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and:

FIG. 2A is a front perspective view of the implementation of an electrical device cover illustrated in FIG. 1A installed over a ground fault current interrupter (GFCI) receptacle with the lid removed showing sectional line B;

FIG. 2B is a cross section view along the section line B of the electrical device cover illustrated in FIG. 2A;

DESCRIPTION

This disclosure, its aspects and implementations, are not limited to the specific components or assembly procedures disclosed herein. Many additional components and assembly procedures known in the art consistent with the intended electrical device cover and/or assembly procedures for an electrical device cover will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such electrical device covers and implementing components, consistent with the intended operation.

Figure 1B:
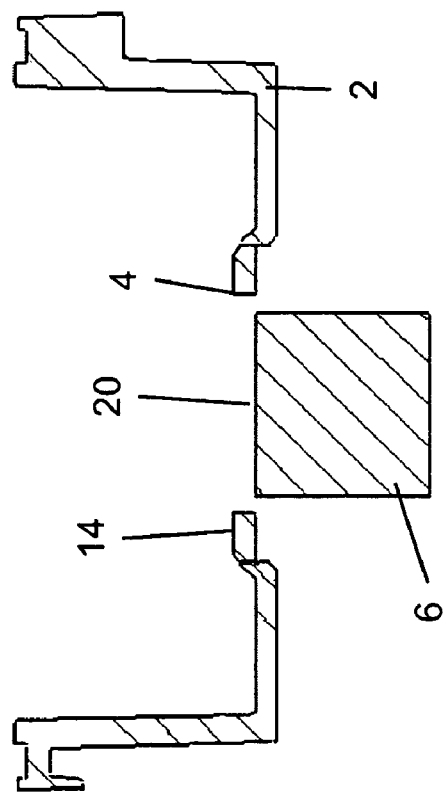
FIG. 1B is a cross section view along the section line A of the electrical device cover illustrated in FIG. 1A.
Figure 1A:
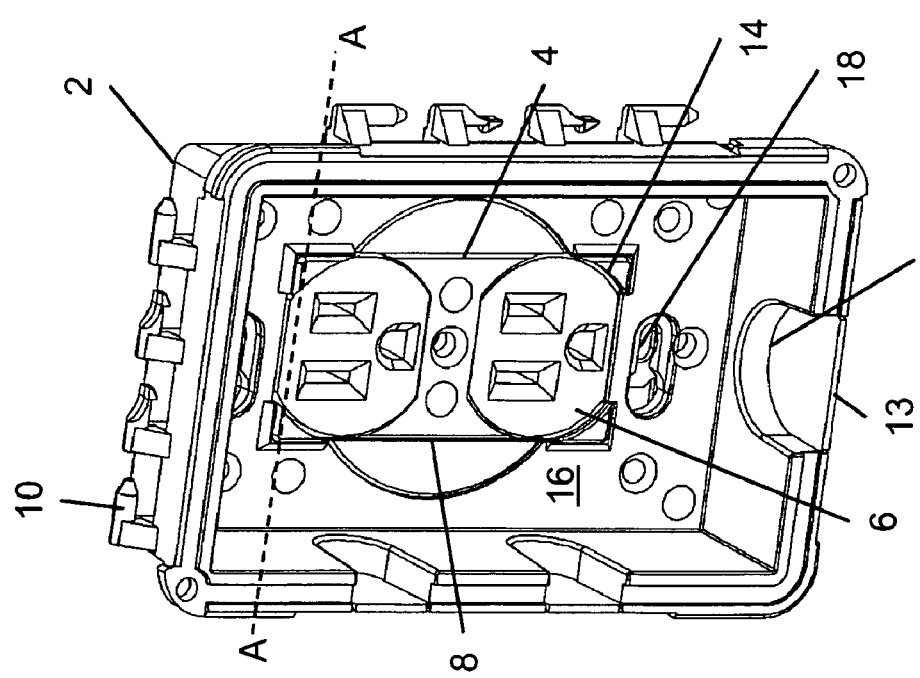
FIG. 1A is a front perspective view of an implementation of an electrical device cover installed over a duplex receptacle with the lid removed showing sectional line A.

Referring to FIG. 1A, an implementation of a base unit 2 of an electrical device cover is illustrated. The base unit 2 may include an electrical device aperture 4 configured to receive the face of an electrical receptacle and at least one box mounting screw aperture 18. As illustrated, the electrical device aperture 4 of the implementation of a base unit 2 illustrated in FIG. 1A has been configured to receive a duplex receptacle 6 through an insert 8 coupled to the base unit 2. Particular implementations of the base unit 2 may include at least one base unit hinge member 10 and at least one cord port 12 in a surface of the base unit 2, though neither hinge members nor cord ports are required for every implementation. For example, the side walls and hinge members shown in FIG. 1A may be removed so that the base unit is substantially planar with the addition of the features and principles taught herein to enable the base unit to be mountable on multiple different electrical device types without permanent or other significant modification.

The at least one base unit hinge member 10 may be configured to correspond to at least one lid hinge member on a lid to allow the lid and the base unit 2 to be hingedly coupled together. Relevant teachings regarding the structure, use, and materials of base unit and lid hinge members and lids may be found in U.S. Pat. No. 5,763,831 to Shotey, et al. entitled "Universal cover plate, cover plate assembly, and related methods" issued Jun. 9, 1998, the disclosure of which is hereby incorporated herein by reference. Those of ordinary skill in the art will readily be able to understand how a lid may be adapted to work with the base unit shown in the Figures shown herein for implementations where hinges are used. In particular implementations, the at least one cord port 12 may be open or closed through a feature designed to preventingress of water and other contaminants. The cord port 12 may also include at least one removable tab 13, the removal of which may allow a cord to extend out of the cord port when a plug is inserted into an electrical device within the electrical device cover.

As illustrated in FIG. 1A, the base unit 2 may include portions that form projections 14 elevated above a top surface 16 of the base unit 2. Referring to the cross section view along the sectional line A of FIG. 1A shown in FIG. 1B, these projections 14 may be raised above the level of the face 20 of the duplex receptacle 6, and may or may not create a gap between the corners of the electrical device aperture 4 and the face 20 of the duplex receptacle 6. FIG. 2A illustrates the base unit 2 of FIGS. 1A and 1B installed over a ground fault current interrupter (GFCI) receptacle 22. As illustrated in the cross section view along sectional line B in FIG. 2B, the projections 14 of the base unit 2 may rest against the face 24 of the GFCI receptacle 22 and allow the base unit 2 to accommodate the face 24 of the GFCI receptacle 22 without requiring permanent or other modification of the base unit 2 (such as the removal of removable tabs or other portions of the base unit). The use of the projections 14 may allow implementations of base units 2 to be interchangeably installed over both duplex, GFCI, and decora-style receptacle covers without requiring the removal of corner tabs as was done in conventional base unit designs. In other implementations, the projections 14 may be removable if desired by a user or may be required to be removed depending upon the receptacle type over which the base unit 2 is being installed.

Figure 3B:
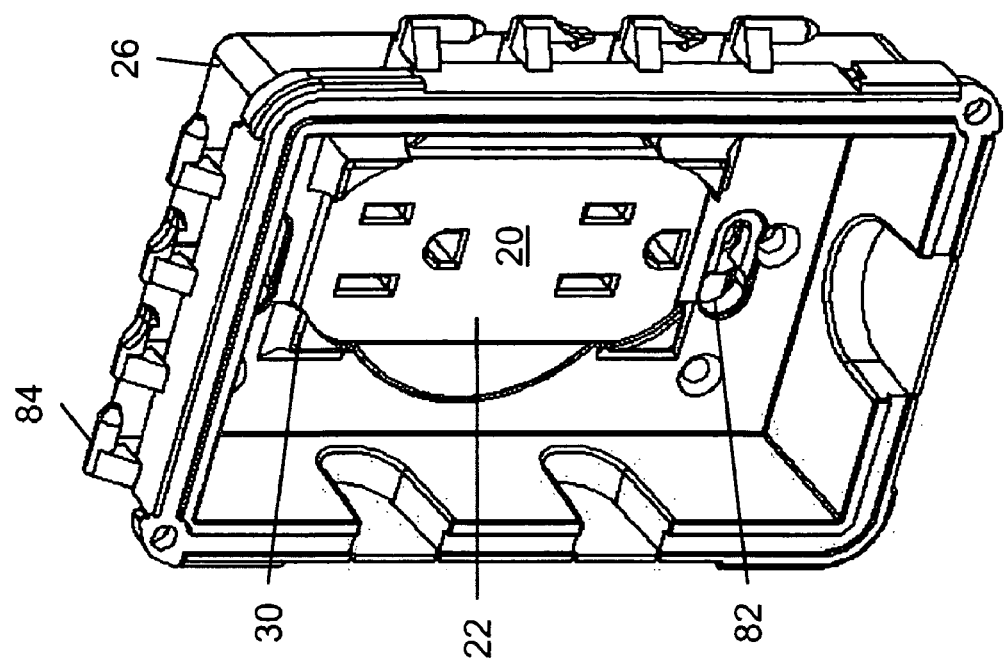
FIG. 3B is a front perspective view of the base unit illustrated in FIG. 3A installed over a GFCI receptacle.
Figure 3A:
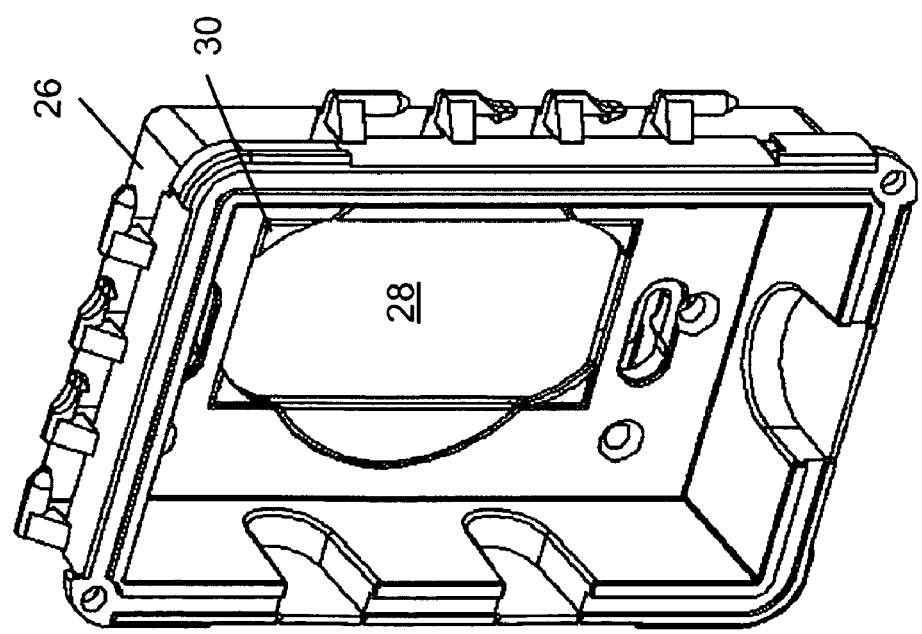
FIG. 3A is a front perspective view of a base unit of another implementation of an electrical device cover with the lid removed.

Referring to FIG. 3A, another particular implementation of a base unit 26 is illustrated. Like the implementation illustrated in FIGS. 1A-2B, this implementation of a base unit 26 also includes an electrical device aperture 28. FIG. 3B shows the implementation of a base unit 26 installed over the GFCI receptacle 22 and illustrates that the base unit 26 may include at least one flexible portion 30 that conforms to and covers a portion of the face 20 of the GFCI receptacle 22 by yielding outward as the base unit 26 is installed over the GFCI receptacle 22. The flexible portion 30 may flexibly stretch to allow the face 20 of the GFCI receptacle to fully extend into the electrical device aperture 28. When the base unit 26 is installed over a duplex receptacle, however, the at least one flexible portion 30 may remain unstretched and rest against the side of the face of the duplex receptacle. In some particular implementations, this flexible portion may substantially eliminate gaps between the edge of the electrical device aperture 28 and the duplex receptacle.

Figure 4B:
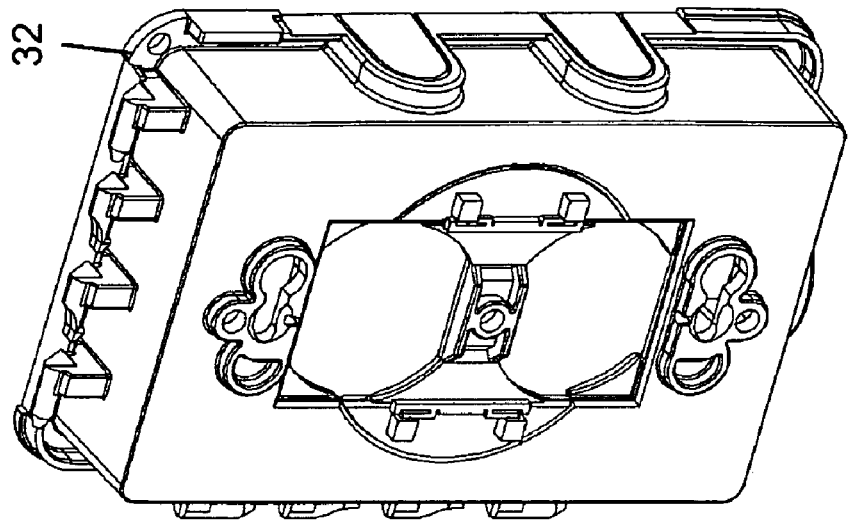
FIG. 4B is a rear perspective view of the base unit and insert illustrated in FIG. 4A coupled together.
Figure 4A:
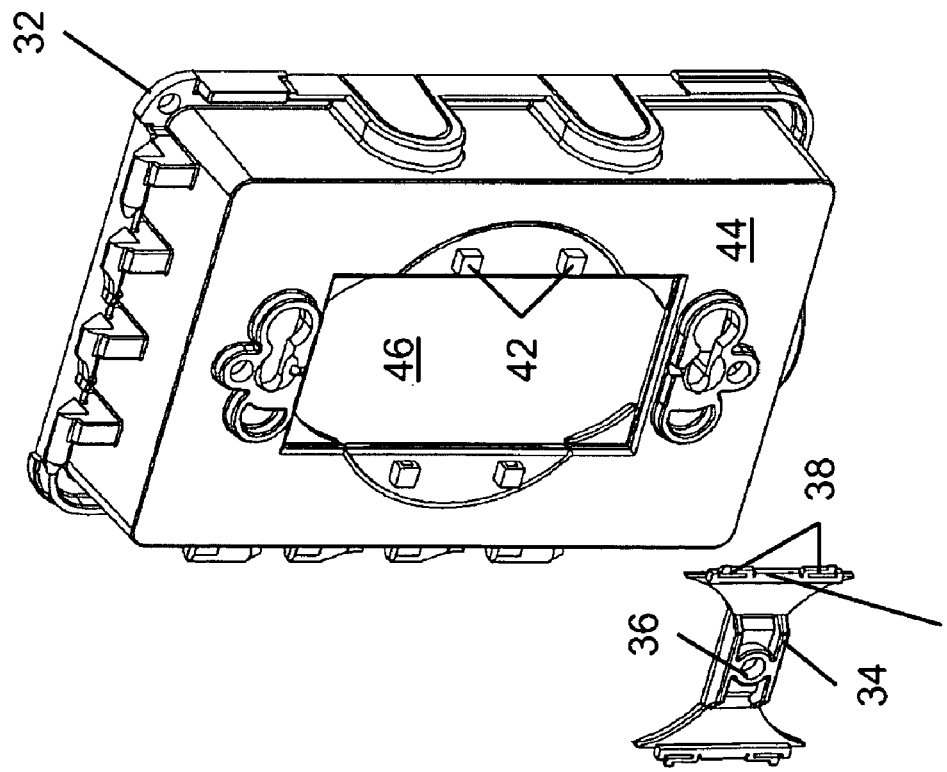
FIG. 4A is a rear exploded perspective view of a implementation of a base unit and an insert.

Referring to FIG. 4A, another particular implementation of a base unit 32 is illustrated. The base unit 32 may include an insert 34 with an electrical device mounting aperture 36 therethrough and at least two flexible insert mounting prongs 38 extending from a side 40 of the insert 34. Particular implementations of a base unit 32, as illustrated in FIG. 4A, may include at least two mounting projection insertion features 42 on a rear surface 44 of the base unit 32. To allow an electrical device aperture 46 in the base unit 32 to accommodate the face of a duplex receptacle, the insert 34 may be coupled to the base unit 32 through coupling the at least two flexible insert mounting prongs 38 with the at least two mounting projection insertion features 42 on the rear surface 44, as illustrated in FIG. 4B. The insert 34 may then be coupled to the duplex receptacle through tightening of an electrical device mounting screw through the electrical device mounting aperture 36.

Figure 5B:
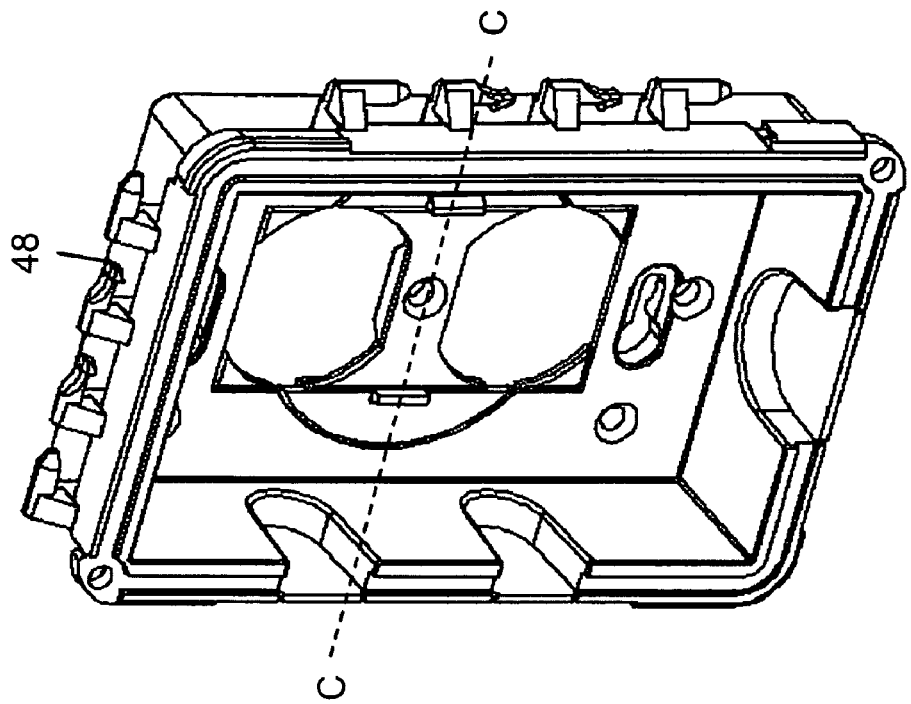
FIG. 5B is a front perspective view of the base unit and insert illustrated in FIG. 5A coupled together showing the sectional line C.
Figure 5A:
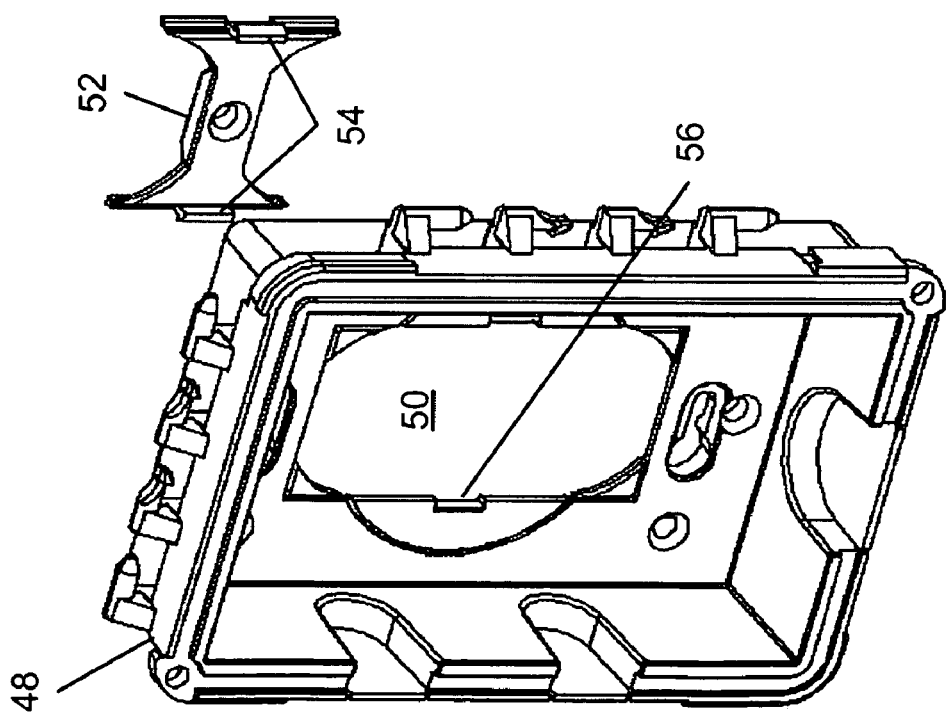
FIG. 5A is a front exploded perspective view of an implementation of a base unit and an insert.
Figure 6:
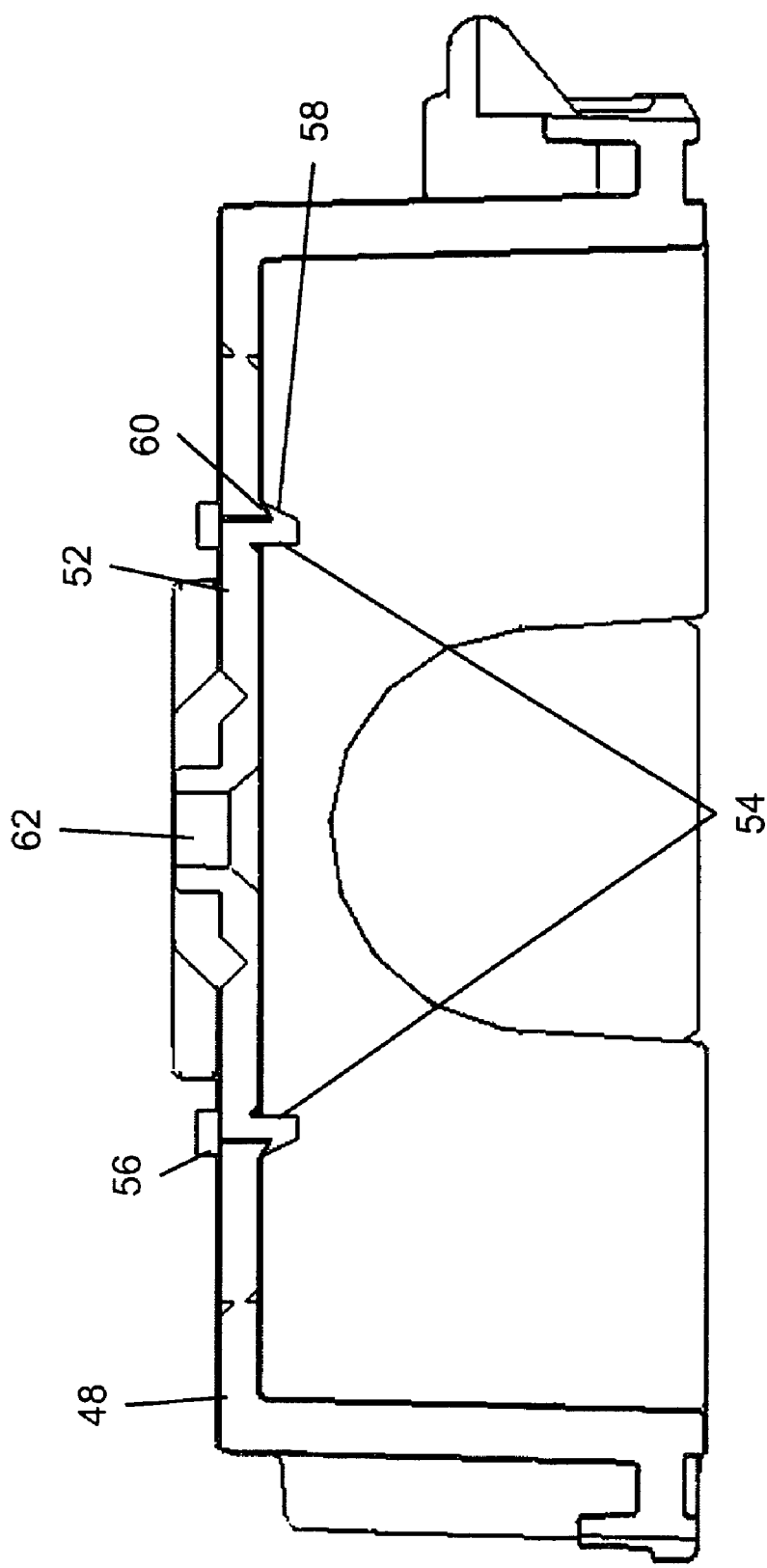
FIG. 6 is a cross section view of the base unit and insert illustrated in FIG. 5A along sectional line C.

FIG. 5A illustrates another particular implementation of a base unit 48 having an electrical device aperture 50 and an insert 52. The insert 52 may include at least two flexible insert mounting prongs 54 that couple at the electrical device aperture 50 along its sides 56. FIG. 5B illustrates the insert 52 coupled at the electrical device aperture 50, configuring the electrical device aperture 50 to accommodate a duplex receptacle. FIG. 6 illustrates a cross section view along sectional line C of the insert 52 coupled to the base unit 48. As illustrated, the at least two flexible insert mounting prongs 54 of particular implementations of an insert 52 may include catches 58 that engage with corresponding ridges 60 on the sides 56 of the electrical device aperture 50. Because the at least two flexible insert mounting prongs 54 may extend through the base unit 48 at the electrical device aperture 50, and the catches 58 engage with the ridges 60, the insert 52 may be able to substantially support a duplex receptacle when coupled with it through the electrical device mounting aperture 62 and substantially reduce the opportunity for the insert 52 to disengage from the base unit 48 under the insertion force of an electrical plug.

Figure 7B:
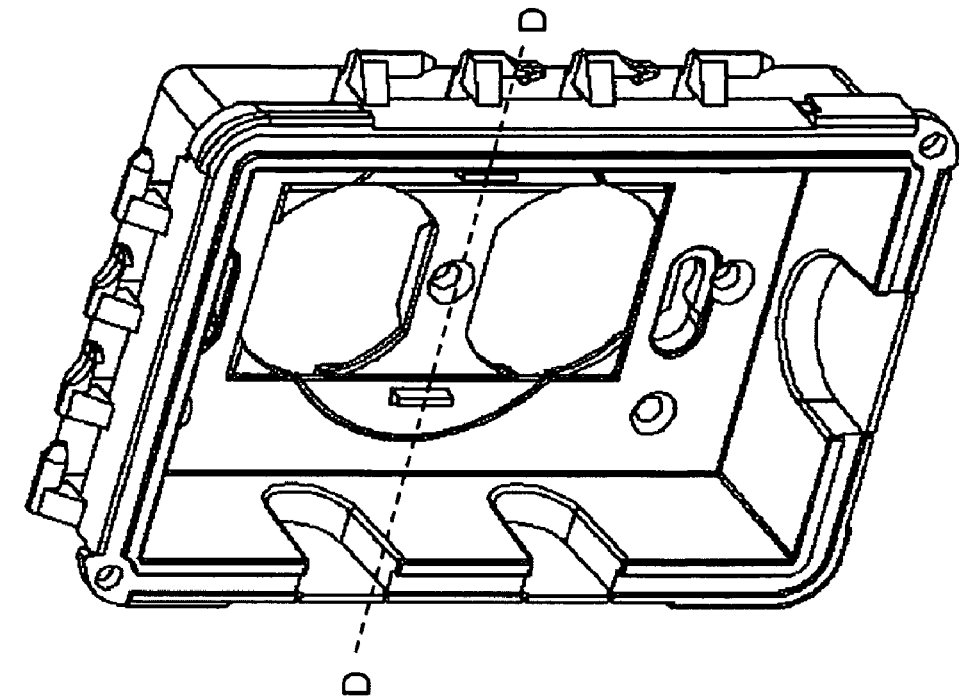
FIG. 7B is a front perspective view of the base unit and insert illustrated in FIG. 7A coupled together showing the sectional line D.
Figure 7A:
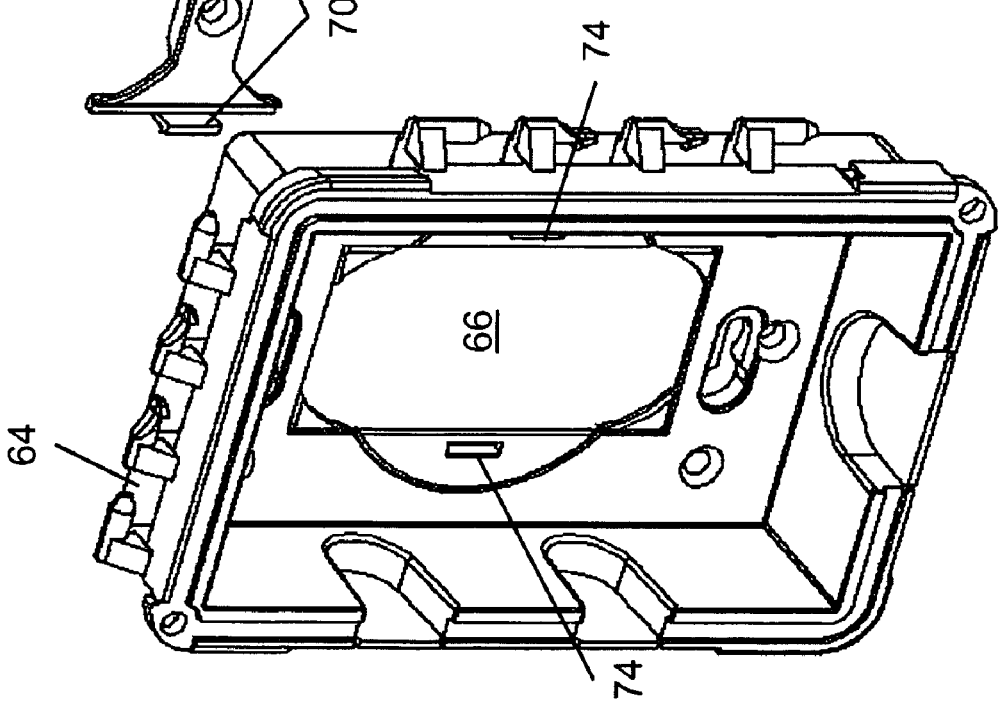
FIG. 7A is a front exploded perspective view of an implementation of a base unit and an insert.
Figure 8:
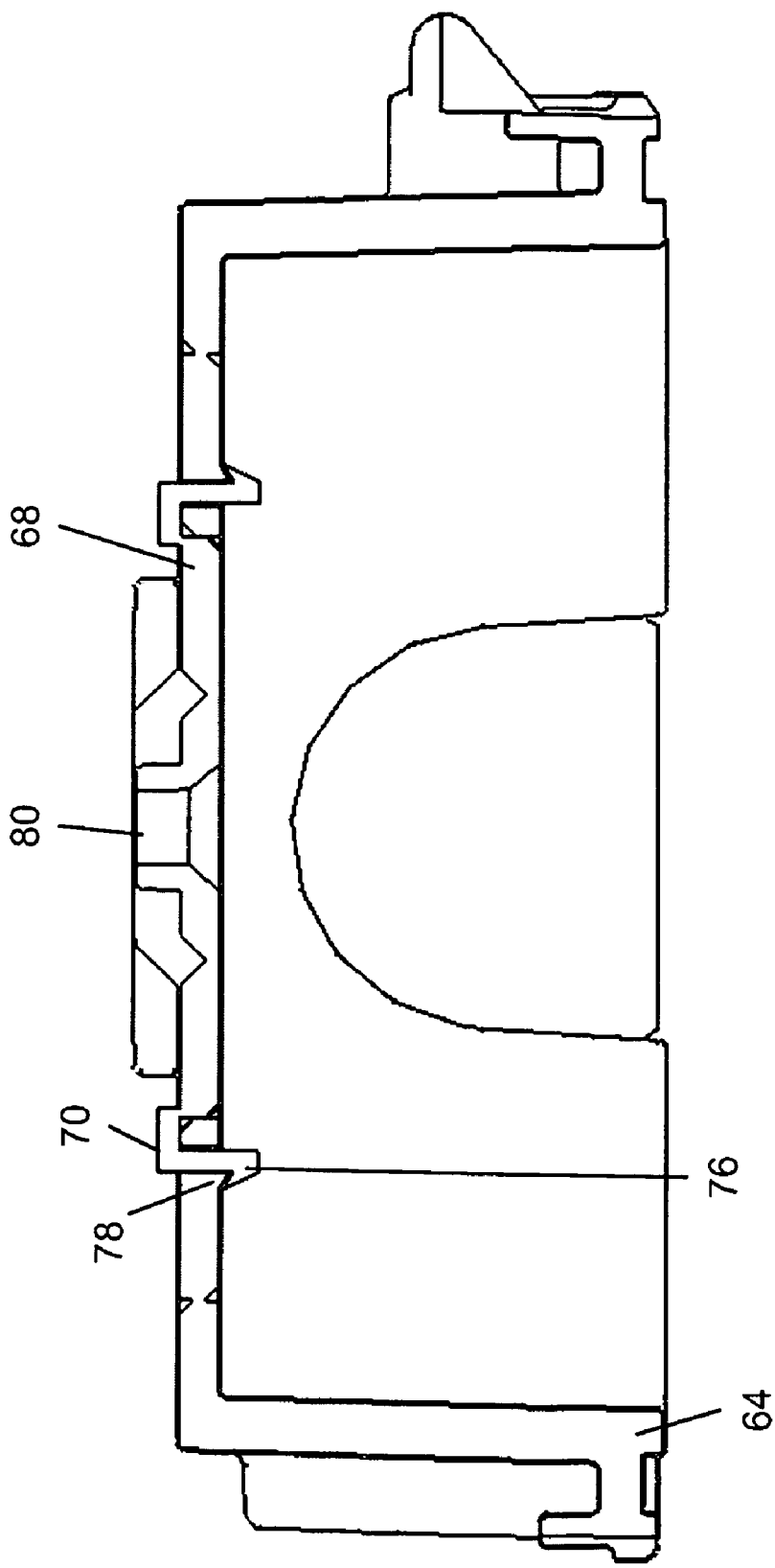
FIG. 8 is a cross section view of the base unit and insert illustrated in FIG. 7A along sectional line D.

Referring to FIGS. 7A and 7B, another particular implementation of a base unit 64 is illustrated. The base unit 64 may include an electrical device aperture 66 and an insert 68 having at least two flexible insert mounting prongs 70 that extend from the sides 72 of the insert 68. The base unit 64 may also include at least two insert mounting apertures 74 therethrough into which the at least two flexible insert mounting prongs 70 may be coupled, as illustrated in FIG. 7B. FIG. 8 illustrates a cross section view along the sectional line D shown in FIG. 7B. As illustrated in FIG. 8, the at least two flexible insert mounting prongs 70 may include catches 76 that engage with corresponding ridges 78 formed on the base unit 64 adjacent to the at least two mounting apertures 74 which may substantially reduce the likelihood that the insert 68 may disengage from the base unit 64 under the force exerted when a plug is inserted into a duplex electrical receptacle coupled to the insert 68 through the electrical device mounting aperture 80.

While the inserts 52 and 68 have been shown in FIGS. 6 and 8 to be located within the electrical device apertures 50, 66 of the base units 48 and 64, in other particular implementations, the inserts 52 and 68 may be located outside of the aperture, such as behind or in front of the plane of the aperture. In addition, particular implementations of base units like those illustrated in FIGS. 4A-8 may include base units that extend flexibly or through projections over the face of a GFCI or decora-style receptacle like those illustrated in FIGS. 1A-3B when the base units are installed over such a receptacle. In cases where base units like those illustrated in FIGS. 4A-8 are installed over a GFCI or decora-style receptacle, the corresponding insert portions may be removed.

Figure 9:
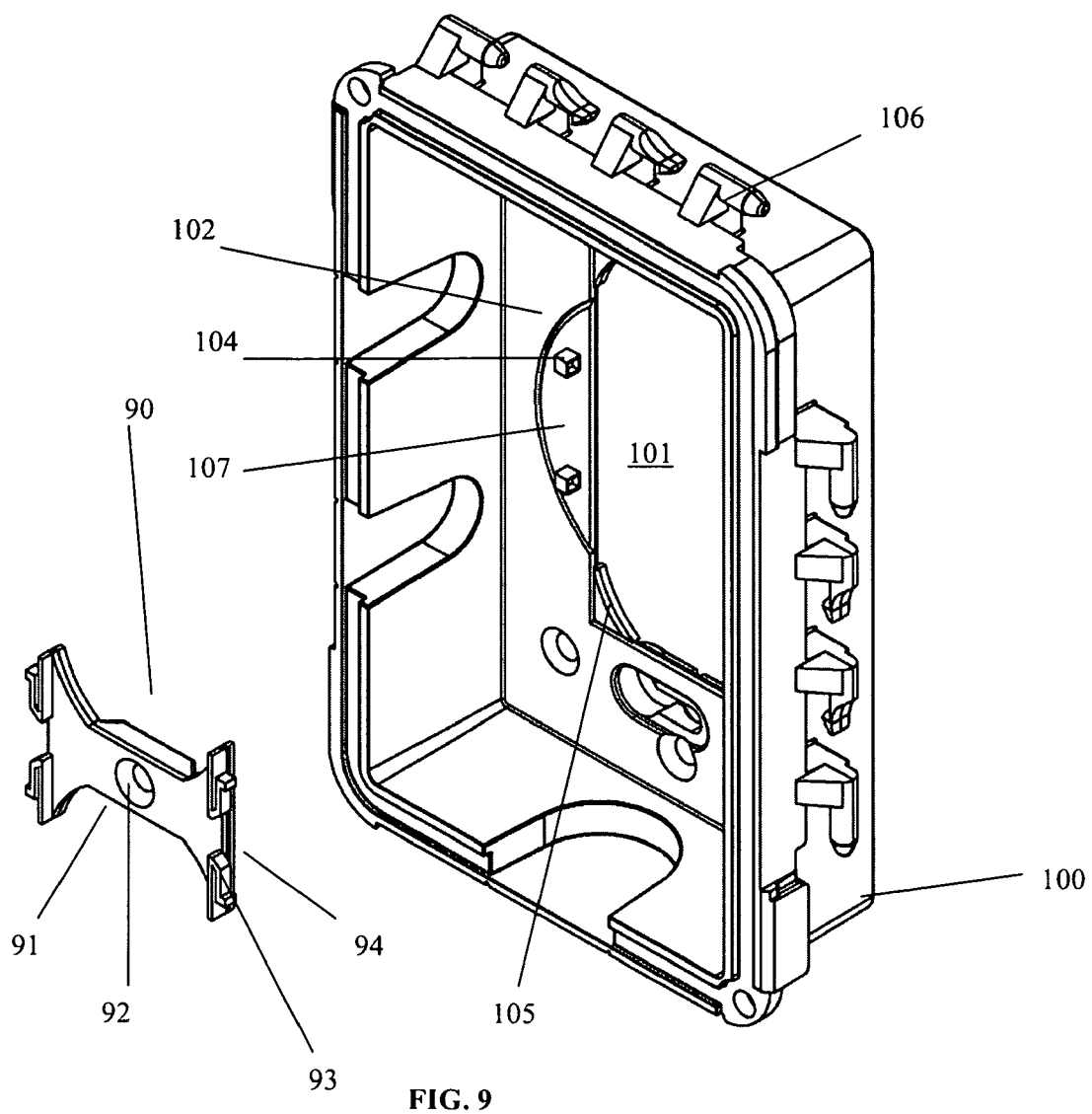
FIG. 9 is an exploded front perspective view of an implementation of an electrical device cover.
Figure 10:
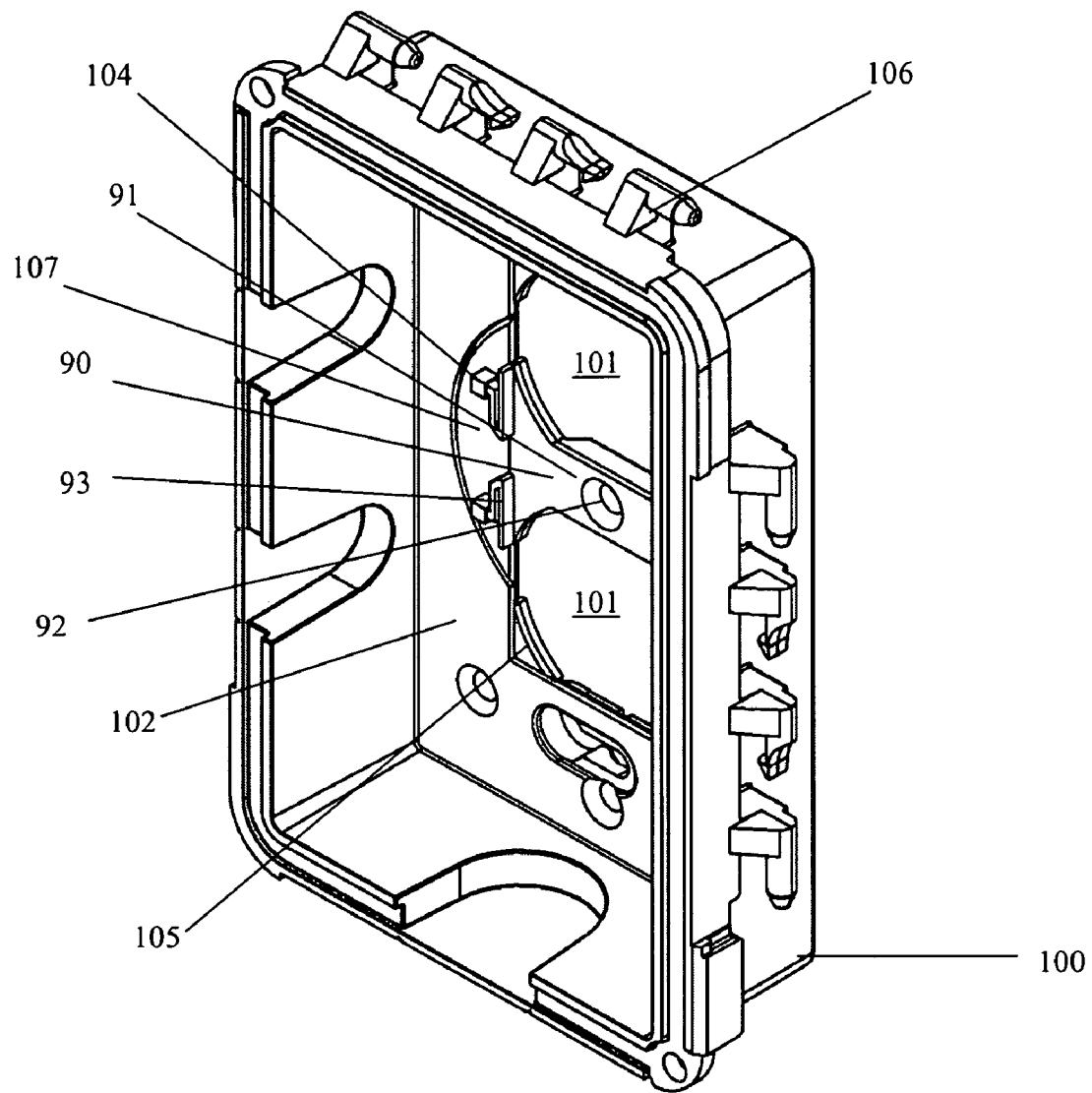
FIG. 10 is a front perspective view of the electrical device cover of FIG. 9 with an attachment coupled to the base unit.
Figure 11:
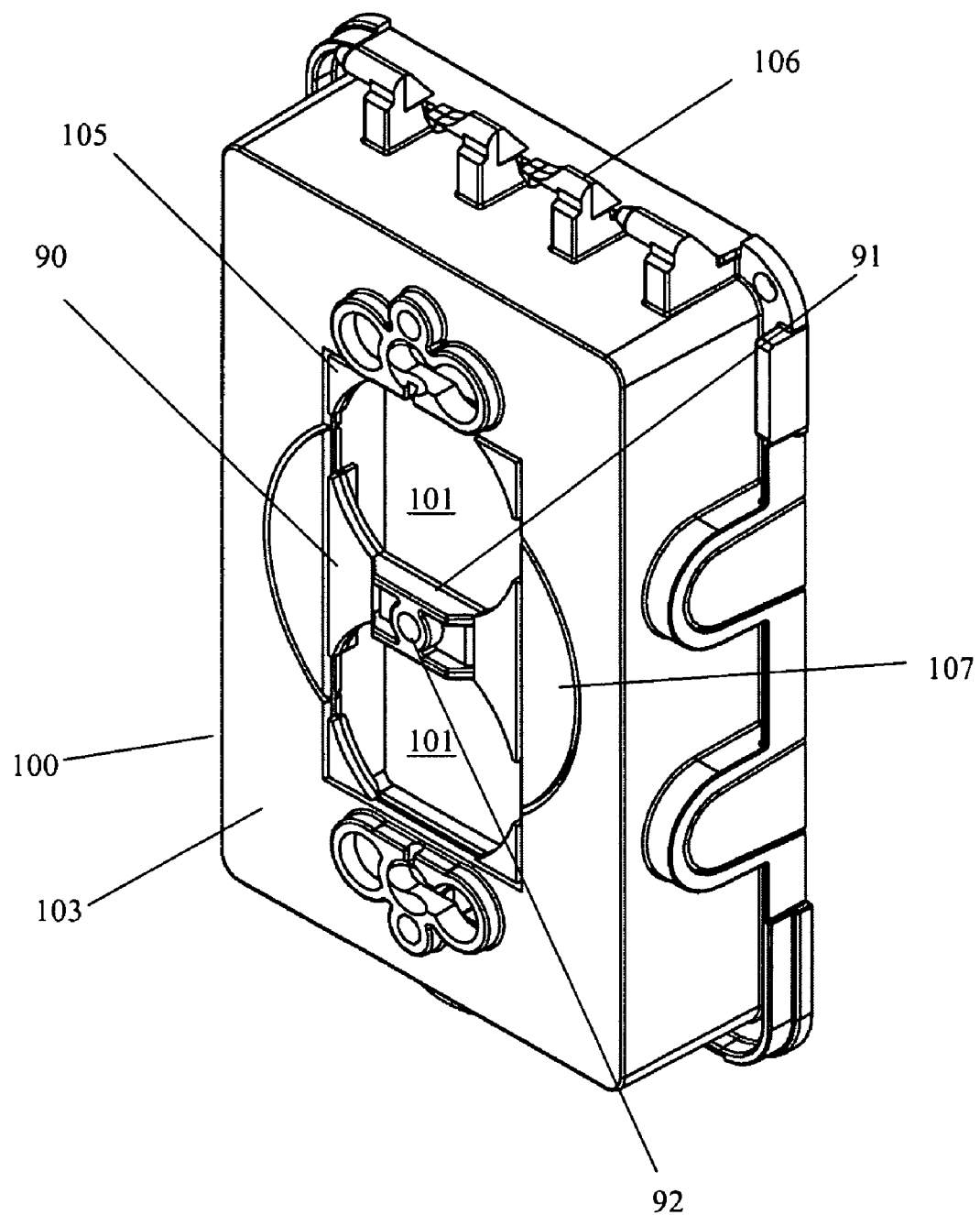
FIG. 11 is a rear perspective view of the electrical device of FIG. 10.

Referring now to FIGS. 9-11, one particular implementation of an electrical device cover attachment 90 comprises: a body 91; at least one receptacle mounting screw aperture 92 therethrough; and at least two flexible attachment mounting projections 93 each extending from a side 94 of the body 91; wherein the attachment 90 is configured to attach to a base unit 100 of the electrical device cover via the at least two flexible attachment mounting projections 93; and wherein the base unit 100 comprises an electrical device aperture 101 therein, the electrical device aperture 101 sized to accommodate one of a face of a first receptacle and two faces of a second receptacle; and wherein the attachment 90 is sized to fit between the two faces of the second receptacle.

The base unit 100 further comprises a front surface 102 and the attachment 90 is configured to attach to the base unit 100 at the front surface 102. The base unit 100 further comprises a rear surface 103, however, and in various other embodiments the attachment 90 may be instead configured to attach to the base unit 100 at the rear surface 103. During operation, the second receptacle may be secured to an electrical box and the base unit 100 may not be secured to the electrical box but the base unit 100 may be secured to the second receptacle via the center receptacle screw of the attachment 90. The at least two flexible attachment mounting projections 93 extend through the base unit 100 and rest against the front surface 102. In various other embodiments, however, the at least two flexible attachment mounting projections 93 may extend through the base unit 100 and rest against the rear surface 103. The at least two flexible attachment mounting projections 93 further extend through the base unit 100 at the electrical device aperture 101. The base unit 100 comprises at least two attachment mounting apertures 104 therethrough adjacent to the electrical device aperture 101, and the at least two flexible attachment mounting projections 93 extend through the base unit 100 through the at least two attachment mounting apertures 104. One or more raised projections 105 of the base unit 100 may be, though it is not required to be, included at the corners of the electrical device aperture 101. If included, the raised projections 105 may be: raised above the level of the face of the first receptacle and covering a portion of the face of the first receptacle of a decora receptacle or ground fault current interrupter (GFCI) receptacle type when the base unit 100 is installed over the first receptacle, and/or raised above the level of the face of a duplex receptacle and exposing a face of a duplex receptacle when the base unit 100 is installed over the duplex receptacle. This functionality has already been described above in paragraph [0033] and the reader should refer to that paragraph to understand the functionality of the raised projections 105, the functionality here being the same as the projections 14 described there.

Still referring to FIGS. 9-11, one particular implementation of an electrical device cover comprises: a base unit 100 comprising a front surface 102, the front surface 102 comprising an electrical device aperture 101 therein sized to accommodate one of a face of a first receptacle of a decora receptacle or ground fault current interrupter (GFCI) receptacle type and a face of a second receptacle of a duplex receptacle. Optionally, the cover may comprise one or more raised projections 105 of the base unit 100 that may be: raised above the level of the face of the first receptacle and covers a portion of the face of the first receptacle of a decora receptacle or ground fault current interrupter (GFCI) receptacle type when the base unit 100 is installed over the first receptacle, and/or is raised above the level of the face of a duplex receptacle and exposes a face of a duplex receptacle when the base unit 100 is installed over the duplex receptacle.

The electrical device cover may further comprise an attachment 90 coupled to the base unit 100, the attachment 90 comprising a receptacle mounting screw aperture 92 therethrough and at least two flexible attachment mounting prongs 93 each extending from a side 94 of the attachment, the at least two flexible attachment mounting prongs 93 extending through the base unit 100 and resting against the front surface 102. In such embodiment, the electrical device cover may be directly coupled to the electrical device through the center receptacle mounting screw so that the electrical device cover is coupled to the wall, the electrical box and the electrical device, like the previous embodiment, only through the attachment 90 and not through any box mounting screws or other device mounting screws. The at least two flexible attachment mounting prongs 93 extend through the base unit 100 at the electrical device aperture 101. The base unit 100 further comprises at least two attachment mounting apertures 104 therethrough adjacent to the electrical device aperture 101, and the at least two flexible attachment mounting prongs 93 extend through the base unit 100 through the at least two attachment mounting apertures 104. The electrical device cover may further comprise a lid comprising at least one lid hinge member and the base unit 100 further comprises at least one base unit hinge member 106 and the lid and the base unit 100 are hingedly coupled together through the at least one lid hinge member and the at least one base unit hinge member 106. The base unit 100 may further comprise at least one removable tab 107, wherein removal of the at least one removable tab 107 converts the electrical device aperture 101 to accommodate the face of an electrical device different from the decora receptacle and ground fault current interrupter (GFCI) receptacle types. The base unit 100 may further comprise at least one attachment plate, wherein the attachment plate converts the electrical device aperture 101 to accommodate a face of a third electrical device of an electrical device different from the decora receptacle and ground fault current interrupter (GFCI) receptacle types. The attachment plate may further comprise at least one removable tab, wherein removal of the at least one removable tab converts the electrical device aperture 101 to accommodate the face of an electrical device different from the decora receptacle and ground fault current interrupter (GFCI) receptacle types.

Figure 13:
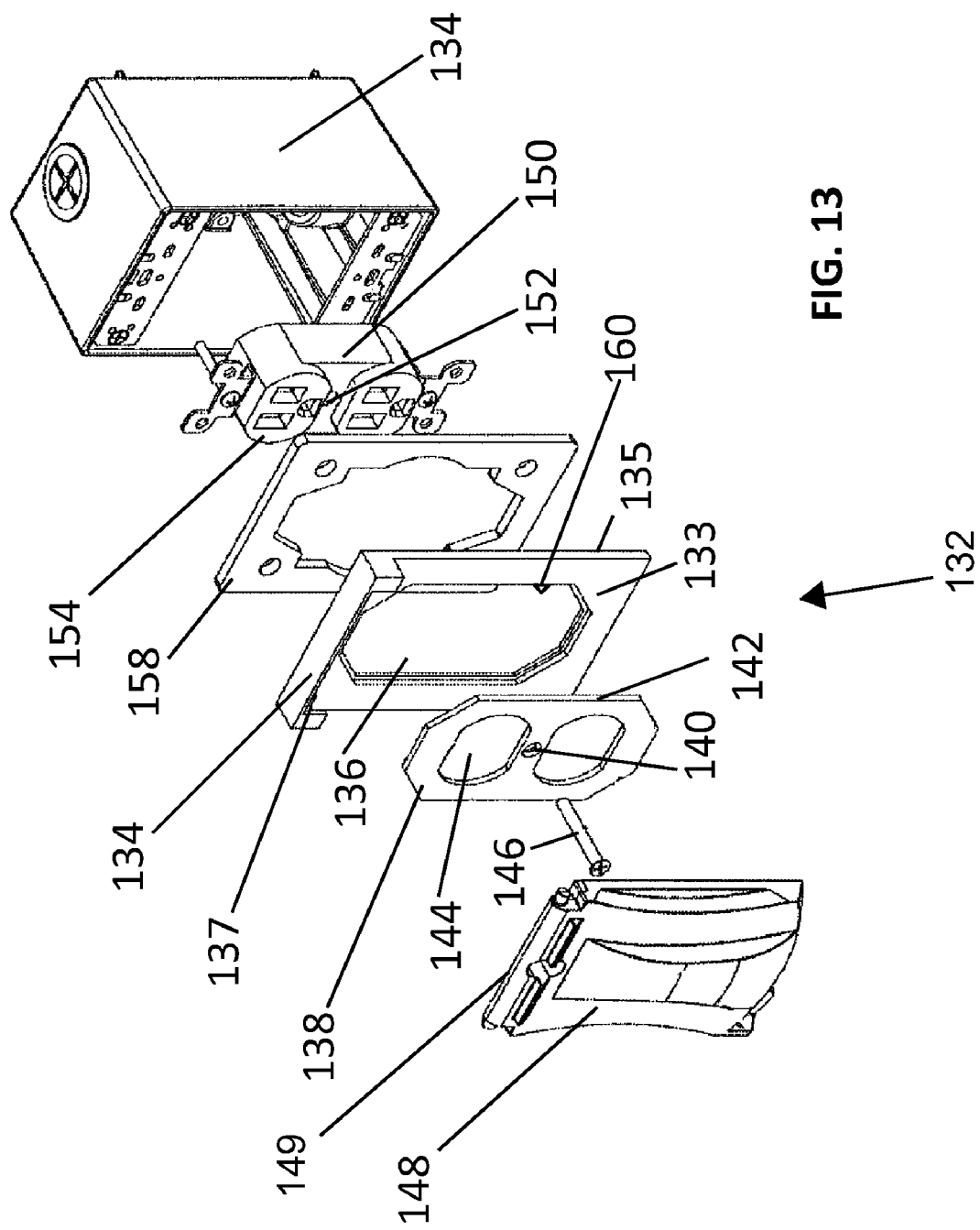
FIG. 13 is an exploded perspective view of another implementation of an electrical device cover assembly.
Figure 14:
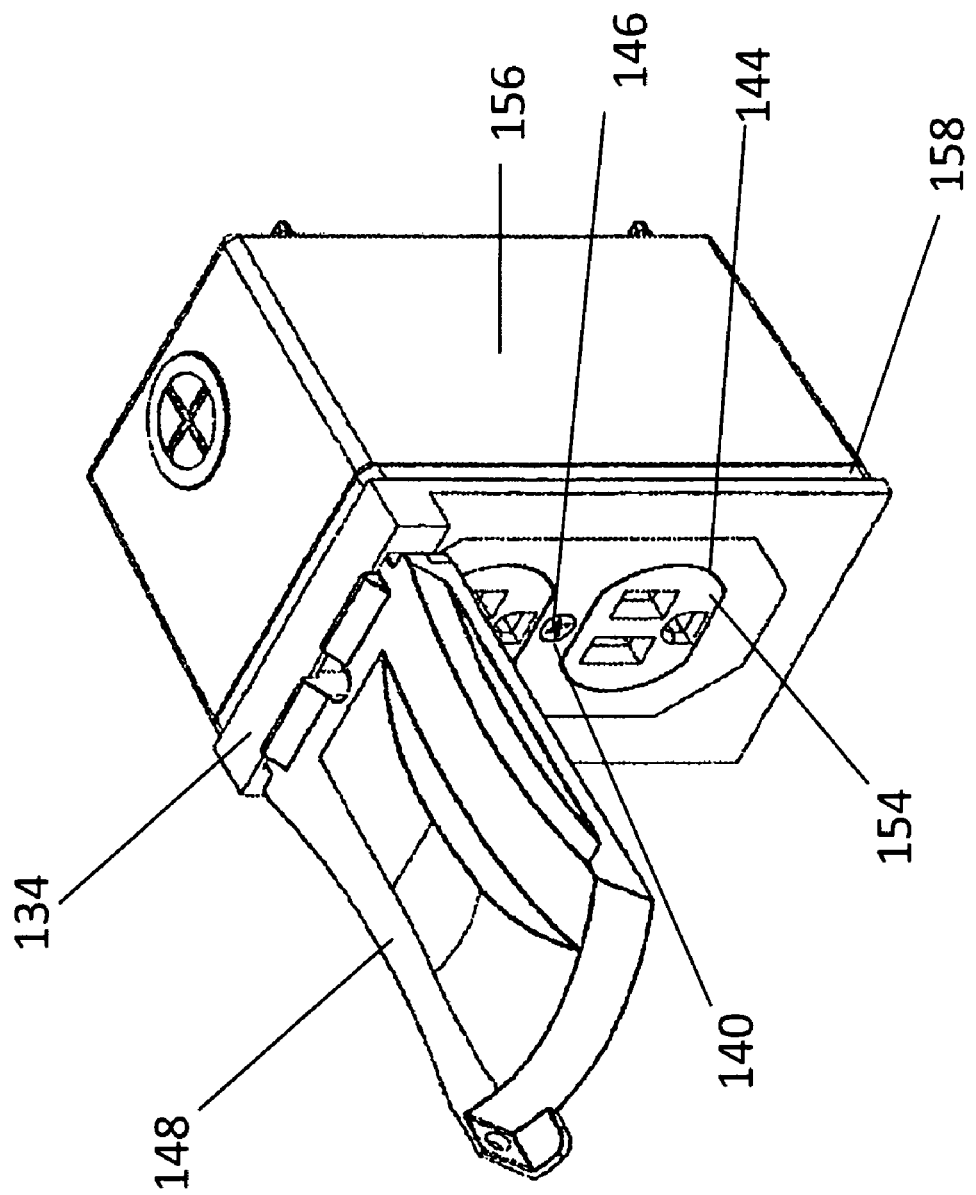
FIG. 14 is an assembled perspective view of device of FIG. 13.

Turning now to FIGS. 13-14, yet another particular implementation of an electrical device cover assembly is illustrated. In particular, the electrical device cover assembly 132 comprises a base unit 134, an attachment 138, and a lid 148. In some particular implementations, a weatherproof gasket 158 may be provided and may be interposed between the base unit 134 and an electrical mounting box 156). The base unit 134 is adapted for placement over an electrical outlet 150 having a grounded center mounting screw hole 152, and, in some particular implementations, comprises therethrough an attachment opening 136. The attachment opening 136 is sized such that, when it is placed over an electrical outlet 150, at least a portion of the electrical outlet 150 (such as front surface 154) extends through the attachment opening 136 and is surrounded by the attachment 138. Significantly, the attachment opening 136 (or another portion of the base unit 134 in those implementations not comprising an attachment opening 136) may comprise one or more bare metal portions to enable electrically conductive contact between the base unit 134 and a attachment 138 (described further below). A lid 148 is hingedly coupled with the base unit 134 via the hinged communication of one or more base hinge elements 137 with one or more lid hinge elements 149. In particular, with the one or more base hinge elements 137 coupled with one or more lid hinge elements 149, the lid 148 is hingedly coupled with the base unit 134 and the lid 148 is moveable between an open position and a closed position with respect to the base unit 134. Once coupled, the base unit 134 and the lid 148 may be in grounded electrical communication with one another.

An attachment 138 is adapted for placement over an electrical outlet 150 having an electrically grounded center screw hole 152. The attachment 138 (and other adapters described herein) may be coupled with the base unit 134 in a variety of ways. Specifically, and by way of non-limiting example, the attachment 138 may be coupled with the base unit 134 from the front side 133 of the base unit 134. Alternatively, the attachment 138 may be coupled with the base unit 134 at a rear surface 135 of the base unit 134. In the particular implementation shown, the attachment 138 comprises a center screw hole 140 and perimeter edge 142. With the attachment 138 coupled with the base unit 134, the perimeter edge 142 may be in contact with the base unit 134. Significantly, the perimeter edge 142 may comprise one or more bare metal portions to enable electrically conductive contact between the attachment 138 and the base unit 134. Significantly, the one or more bare metal portions of the base unit 134 and/or the one or more bare metal portions of the perimeter edge 142 of the metal attachment plate may initially be shipped to a user covered with a powder coat or other coating. In such implementations, one of the attachment opening 136 of the base unit 134 and the perimeter edge 142 of the attachment 138 may comprise one or more raised edges 160 configured to abrade the coating to expose bare metal and to allow for electrically conductive contact between the attachment 138 and the base unit 134. Specifically, when the base unit and the metal attachment 138 are coupled together, the coating on the perimeter edge 142 of the attachment 138 and/or the coating on the attachment opening 136 of the base unit 134 may be abraded by the one or more raised edges 160 (which may be configured to have one or more cutting edges), such that a portion of the coating is removed, thus enabling bare metal to bare metal, electrically conductive contact between the attachment opening 136 of the base unit 134 and the perimeter edge 142 of the attachment 138.

In some particular implementations, the attachment 138 may comprise at least two flexible attachment mounting projections (not specifically shown in FIGS. 13-14, but may comprise, by way of non-limiting example, the projections 38 from FIG. 4A, or the projections 54 from FIG. 5A). In those particular implementations comprising two or more flexible attachment mounting projections on the perimeter edge 142 of the attachment 138, the at least two flexible attachment mounting projections may communicate with two or more mounting projection insertion features of the base (not specifically shown in FIGS. 13-14, but may comprise, by way of non-limiting example, mounting projection insertion features 42 from FIG. 4A, or the mounting projection insertion features 56 from FIG. 5A).

Notwithstanding the particular way in which the perimeter edge 142 of the attachment 138 is coupled with the attachment opening 136 of the base unit 134, and notwithstanding whether the attachment 138 is coupled from the front side 133 or the rear side 135 of the base unit 134, the base unit 134, the attachment 138 and the electrical outlet 150 are grounded in electrical communication with each other when coupled together. In particular, with the base unit 134 placed over the electrical outlet 150, and with the attachment 138 inserted in the attachment opening 136 of the base such that the attachment center screw hole 140 is aligned with the electrically grounded center screw hole 152 of the electrical outlet 150, a user may thereafter insert mounting screw 146 through the attachment center screw hole 140 and then in the electrically grounded center screw hole 152. In order to complete the coupling of the attachment 138, the base unit 134 and the electrical outlet 150, a user may tighten the mounting screw 146 with respect to the electrically grounded center screw hole 152 and coupled the lid 148 to the base unit 134.

In some particular implementations, the attachment 138 may comprise one or more electrical outlet openings 144 therethrough. When installed, the one or more electrical outlet openings 144 may surround a portion of an electrical outlet 150 (as in the non-limiting example provided in FIG. 14, showing where the electrical outlet openings 144 surround the front surfaces 154 of the electrical outlet 150). Notwithstanding, in some particular implementations, the attachment 138 may not comprise one or more electrical outlet openings 144 or, alternatively, the one or more electrical outlet openings 144 may not completely surround a portion of an electrical outlet 150 such as, by way of non-limiting example, the one or more electrical outlet openings 144 are substantially penannular or semiannular in shape.

Implementations of base units may also include at least one removable tab, the removal of which allows the electrical device aperture of the base unit to accommodate the face of an electrical device of a type different from what the base unit was originally configured to accommodate. In particular implementations, the base units may include at least one attachment plate (also called adapter plate) that may similarly convert the electrical device aperture of the base unit to accommodate a different electrical device type from what the base unit was originally configured to accommodate. In other particular implementations, the attachment plate may include removable tabs, the removal of which serves the aforementioned purposes of converting the electrical device aperture in the base unit. Relevant teachings regarding the structure, use, and materials of removable tabs and adapter plates may be found in U.S. Pat. No. 7,119,277 to Shotey, et al., entitled "Convertible electrical device cover and method for installing same" issued Oct. 10, 2006, the disclosure of which is hereby incorporated herein by reference. Those of ordinary skill in the art will readily understand how to incorporate adapter or attachment plates and/or removable tabs into the base unit of the covers disclosed herein.

Implementations of electrical device covers and implementing components may be constructed of a wide variety of materials. For example, the components may be formed of: rubbers (synthetic and/or natural) and/or other like materials; glasses (such as fiberglass), carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, lead, iron, steel, carbon steel, alloy steel, tool steel, stainless steel, brass, tin, antimony, aluminum, any combination thereof, and/or other like materials; alloys, such as aluminum alloy, titanium alloy, magnesium alloy, copper alloy, any combination thereof, and/or other like materials; any other suitable material; and/or any combination of the foregoing thereof. For the exemplary purposes of this disclosure, the base units, attachment plates, and lids may be formed of a plastic material like a polyvinyl chloride (PVC). The flexible portions of the base units may be formed of a rubber, silicon or other flexible and/or conforming material.

Some components defining electrical device cover or electrical device cover assembly implementations may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve vacuum forming, injection molding, blow molding, casting, forging, cold rolling, milling, drilling, reaming, turning, grinding, stamping, pressing, cutting, bending, welding, soldering, hardening, riveting, punching, plating, and/or the like. Components manufactured separately may then be coupled or removably coupled with the other integral components in any manner, such as with adhesive, a weld joint, a solder joint, a fastener (e.g. a bolt and a nut, a screw, a rivet, a pin, and/or the like), washers, retainers, wrapping, wiring, any combination thereof, and/or the like for example, depending on, among other considerations, the particular material forming the components. For the exemplary purposes of this disclosure, the base unit may be formed separately through an injection molding process and the flexible portion of the base unit may be formed by selectively applying a rubber material to the edges of the electrical device aperture in an overmolding process.

Use.

Referring to FIG. 3A, a particular implementation of a base unit 26 is illustrated prior to installation over a GFCI or decora-style receptacle 22. The base unit 26 may be installed by inserting the base unit 26 over the face 20 of the GFCI or decora style receptacle 22 and exerting sufficient force to cause the at least one flexible portion 30 of the base unit 26 to yield and conformally cover a portion of the face 20 of the GFCI or decora style receptacle 22. The base unit 26 can then be secured to the electrical box through the at least one box mounting screw aperture 82. A lid can then be coupled to the base unit 26 through the base unit hinge members 84 if desired.

Referring to FIGS. 1A-2B, a particular implementation of a base unit 2 is illustrated. In FIG. 1A, the center insert 4 is inserted so that the openings substantially conform to the size and shape of a duplex receptacle face 6. By removing the center insert 4, the opening is converted to receive the size and shape of a decora or GFCI receptacle face 22.

In each of these examples, it can be seen that the base unit may be mounted to either of at least two different types of receptacles with only minor modification. In these non-limiting examples, modification was made to a duplex-type receptacle by including the center insert, and a decora or GFCI-type receptacle by simply removing the center insert. The base unit was configured such that it will fit the shape of the edges of both the duplex-type receptacle and the GFCI-type receptacle. Similarly, it is specifically contemplated that this principle may be adapted to conform to two or more different sizes of round receptacle openings.

Figure 12:
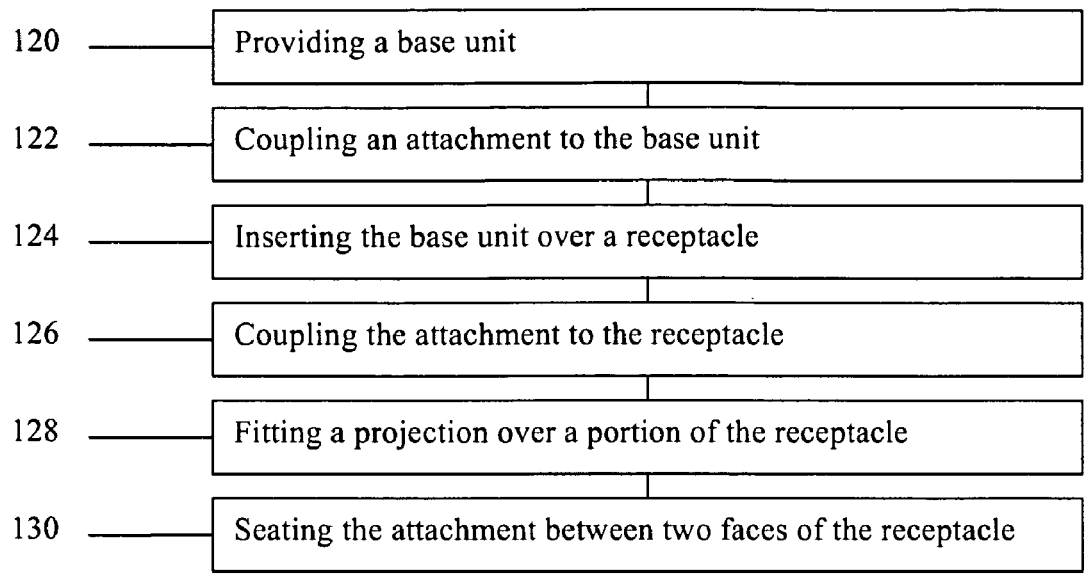
FIG. 12 is a diagram of a method of installing an electrical device cover.

Referring now to FIG. 12, one method of installing an electrical device cover comprises 120 providing a base unit; 122 coupling an attachment to the base unit; 124 inserting the base unit over a receptacle; and 126 coupling the attachment to the receptacle. The method may further comprise 128 fitting a projection over a portion of the receptacle. The method may further comprise 130 seating the attachment between two faces of the receptacle.

For example, in one method of installing the electrical device cover of FIGS. 9-11, the method comprises: 120 providing a base unit 100 comprising an electrical device aperture 101 therein, the electrical device aperture 101 configured to expose a face of a duplex receptacle; 122 coupling an attachment 90 to the base unit 100; 124 inserting the base unit 100 over one of a decora receptacle, a ground fault current interrupter (GFCI) receptacle, and a duplex receptacle; and 126 coupling the attachment 90 to at least one of the duplex receptacle, ground fault current interrupter (GFCI) receptacle, and decora receptacle. This method may further comprise 128 fitting a projection 105 of the base unit 100 over a portion of the face of the decora receptacle or ground fault current interrupter (GFCI) receptacle. The method may further comprise 130 seating the attachment 90 between two faces of the duplex receptacle. The method may further comprise coupling the electrical device cover to the receptacle via the attachment 90 but not coupling the electrical device cover directly to an electrical box containing the receptacle. In other words the electrical device cover may function by being connected solely to the receptacle via the attachment 90. For instance a single screw coupling the attachment 90 to the receptacle through the receptacle mounting screw aperture 92 may be all that keeps the electrical device cover fixed in position relative to an electrical box holding the receptacle when in use.

Referring specifically to FIGS. 13-14, an exemplary method of installing an electrical device cover assembly comprises placing a base unit 134 having a front surface 133, a rear surface 135 and an attachment opening 136 therethrough over an electrical outlet 150 having an electrically grounded center screw hole 152 such that at least a portion of a front surface 154 of the electrical outlet 150 extends through the attachment opening 136. With a front surface 154 of the electrical outlet 150 extending through the attachment opening 136, a user may thereafter insert a attachment 138 having an attachment center screw hole 140 and a perimeter edge 142 into the attachment opening 136 of the base unit 134 so that the perimeter edge 142 of the attachment 138 is in contact with the attachment opening 136 of the base unit 134.

A user may thereafter establish electrically conductive contact between the perimeter edge 142 of the attachment 138 and the attachment opening 136 of the base unit 134 simply by inserting the attachment 138 into the attachment opening 136 of the base unit. Inserting the attachment 138 into the attachment opening 136 of the base unit 134 may comprise inserting the attachment 138 from the front surface 133 of the base unit 134. Alternatively, inserting the attachment 138 into the attachment opening 136 of the base unit 134 comprises inserting the attachment 138 at the rear surface 135 of the base unit 134. Significantly, in those particular implementations comprising a powder coat or other coating on the attachment 138 and the base unit 134, establishing a bare metal to bare metal contact between the perimeter edge 142 of the attachment 138 and the attachment opening 136 of the base unit 134 may first comprise abrading or otherwise removing at least a portion of the powder coat from the perimeter edge 142 of the attachment 138 and the attachment opening 136 of the base unit 134 (such as via one or more raised edges 160 on one of the perimeter edge 142 of the attachment 138 and the attachment opening 136 of the base unit 134, as described above). The exemplary method of installation further comprises coupling together in grounded electrical communication the attachment 138, the base unit 134, and the electrical outlet 150 via the insertion of a mounting screw 146 into the attachment center screw hole 140 and thereafter in the electrically grounded center screw hole 152 of the electrical outlet 150. The lid 148 may thereafter be hingedly coupled with the base unit 134.

It will be understood that implementations are not limited to the specific components disclosed herein, as virtually any components consistent with the intended operation of a method and/or system implementation for and electrical device cover may be utilized. Accordingly, for example, although particular base units and lids may be disclosed, such components may comprise any shape, size, style, type, model, version, class, grade, measurement, concentration, material, weight, quantity, and/or the like consistent with the intended operation of a method and/or system implementation for an electrical device cover may be used.

In places where the description above refers to particular implementations of an electrical device cover, it should be readily apparent that a number of modifications may be made without departing from the spirit thereof and that these implementations may be applied to other electrical device covers. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A grounded electrical device cover assembly comprising:
   a base unit adapted for placement in front of an electrical device and comprising an electrically conductive surface;
   a lid hingedly coupled with the base unit and moveable between an open position and a closed position with respect to the base unit;
   an attachment plate coupled with the base unit and adapted for placement at least partially around the electrical device having an electrically grounded center screw hole, the attachment plate comprising an attachment center screw hole therethrough and a perimeter edge having an electrically conductive surface in contact with the electrically conductive surface of the base unit;

wherein the base unit and the attachment plate are coupled in grounded electrical communication with the electrical device via a mounting screw inserted through the attachment center screw hole and the center screw hole of the electrical device.

2. The assembly of claim 1, wherein the base unit further comprises a front side and the attachment plate is coupled to the electrical device from the front side of the base unit via the mounting screw inserted through the attachment center screw hole and in the electrically grounded center screw hole of the electrical device, such that the base unit is secured to the electrical device between the attachment plate and the electrical device.

3. The assembly of claim 1, wherein the attachment plate further comprises an electrical device opening therethrough, the electrical device opening adapted to surround the electrical device.

4. The assembly of claim 3, wherein a bare metal surfaces of the electrical device opening and a perimeter edge of the attachment plate are covered with a coating and wherein the electric device opening of the base unit and the perimeter edge of the attachment plate comprises one or more raised edges such that when the base unit and the attachment plate are coupled together, the coating is abraded by the one or more raised edges such that bare metal to bare metal contact is made between the base unit and the attachment plate.

5. The assembly of claim 1, wherein the attachment plate further comprises an electrical device opening therethrough and wherein, when installed, the electrical device opening surrounds the electrical device.

6. An electrical device cover attachment comprising:
an insert comprising
a body;
at least one center mounting screw aperture therethrough; and
at least two flexible attachment mounting projections each extending from a side of the body;
wherein the insert is configured to attach to a base unit of the electrical device cover attachment from a front side of the base unit via mechanical engagement of the at least two flexible attachment mounting projections with at least two projection insertion features of the base unit; and
wherein the insert is further configured to attach to an electrical device having a center screw hole therein via a fastener inserted through the center mounting screw aperture of the insert and in the center screw hole of the electrical device, such that the insert is secured between the base unit and the electrical device by the fastener.

7. The electrical device cover attachment of claim 6, wherein the base unit comprises an electrical device aperture therein, the electrical device aperture sized to accommodate a face of a ground fault current interrupter (GFCI) receptacle and alternatively two faces of a duplex receptacle; and wherein the insert is sized to fit between the two faces of the duplex receptacle.

8. The electrical device cover attachment of claim 6, wherein the base unit further comprises a rear surface and the insert is configured to attach to the base unit at the rear surface.

9. The electrical device cover attachment of claim 6, wherein the base unit is directly secured to the electrical box only through the insert.

10. The electrical device cover attachment of claim 6, wherein the at least two flexible attachment mounting projections extend through the base unit at the electrical device aperture.

11. The electrical device cover attachment of claim 6, wherein the base unit further comprises at least two attachment mounting apertures therethrough adjacent to the electrical device aperture, and the at least two flexible attachment mounting projections extend through the base unit through the at least two attachment mounting apertures.

12. A method of installing a grounded electrical device cover assembly comprising:
placing a base unit having a front surface, a rear surface and an opening therethrough over an electrical outlet having an electrically grounded center screw hole such that at least a portion of a front surface of the electrical outlet extends through the opening;
inserting a metal attachment plate having an attachment center screw hole and a metal perimeter edge into the opening of the base unit;
establishing electrically conductive contact between the metal perimeter edge of the metal attachment plate and a metal raised edge of the base unit; and
coupling the metal attachment plate, the base unit, and the electrical outlet via an insertion of a mounting screw into the attachment center screw hole and the electrically grounded center screw hole of the electrical outlet.

13. The method of claim 12, wherein inserting the metal attachment plate into the opening of the base unit comprises inserting the metal attachment plate at the front surface of the base unit.

14. The method of claim 12, wherein inserting the metal attachment plate into the opening of the base unit comprises inserting the metal attachment plate at the rear surface of the base unit.

15. The method of claim 14, further comprising coupling a lid to the base unit moveable between an open position and a closed position with respect to the base unit.

* * * * *